No. 625,367.  
W. SWINDELL.  
METALLURGICAL FURNACE.  
(Application filed Dec. 14, 1898.)  
(No Model.) 4 Sheets—Sheet 1.
Patented May 23, 1899.
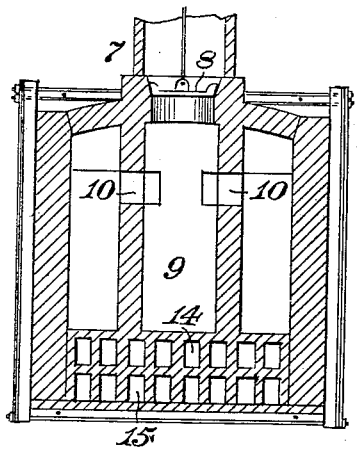
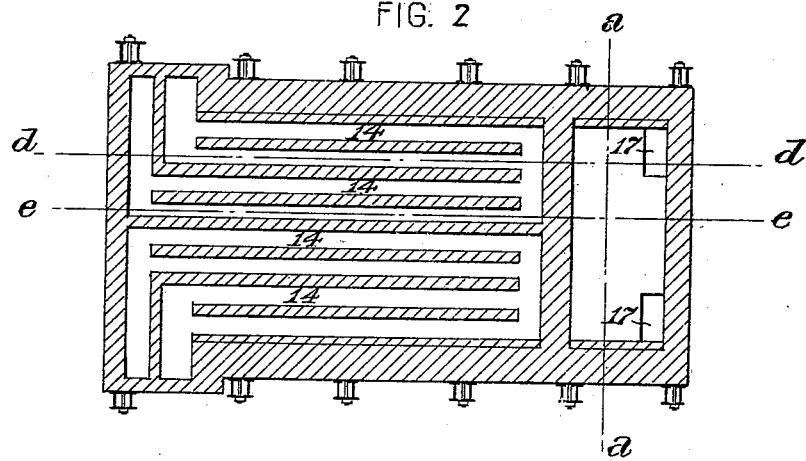
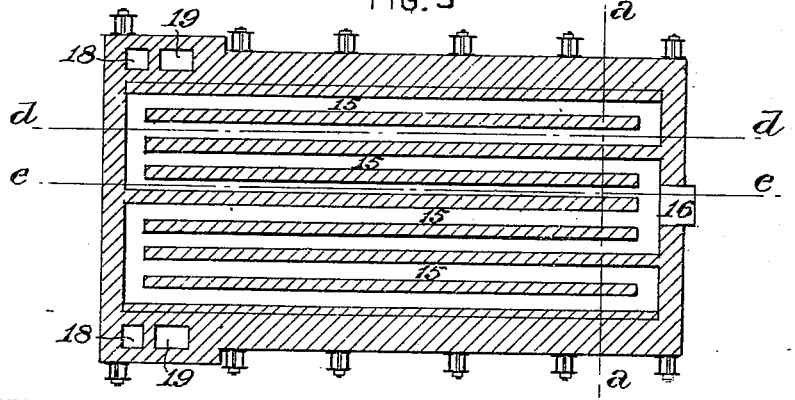
WITNESSES:  
James C. Herron  
S. R. Bell
INVENTOR,  
Wm Swindell  
by J. Snowden Bell,  
Att'y.

No. 625,367. Patented May 23, 1899.
W. SWINDELL.
METALLURGICAL FURNACE.
(Application filed Dec. 14, 1898.)
(No Model.) 4 Sheets—Sheet 2.
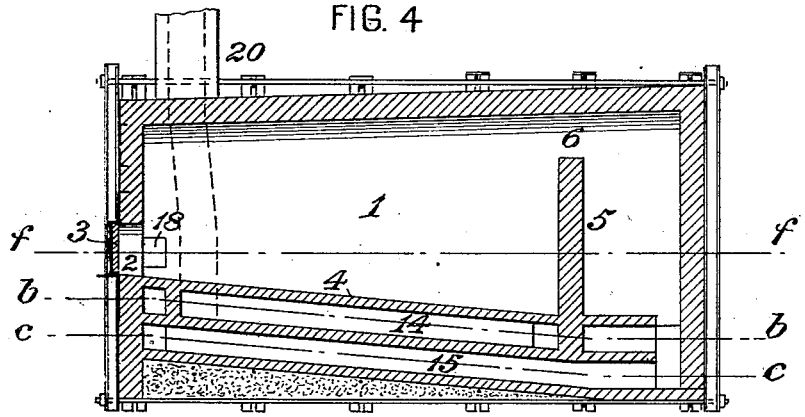
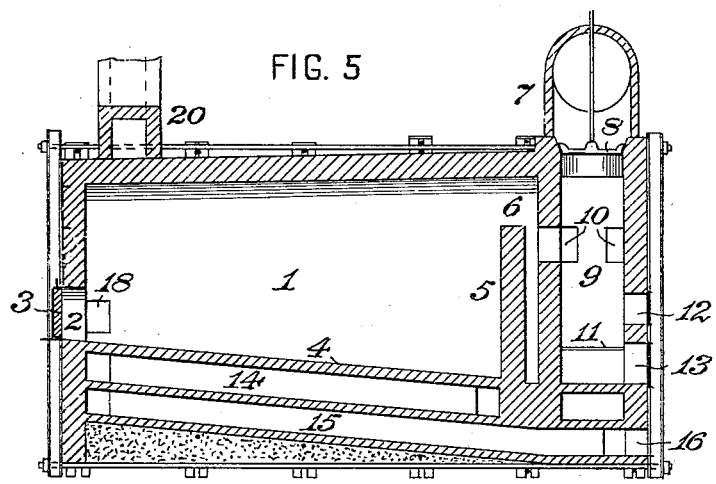
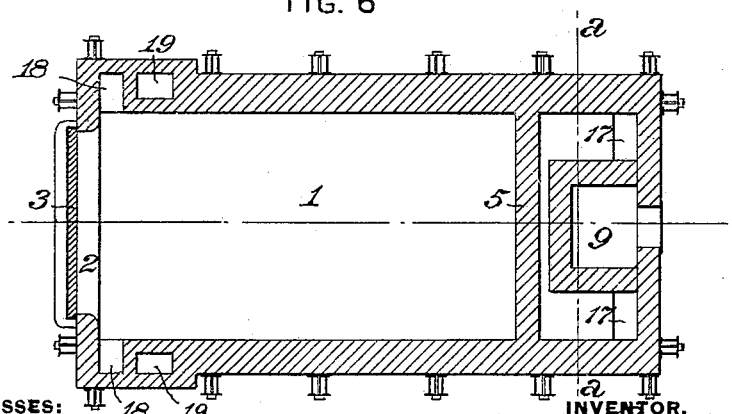

No. 625,367. Patented May 23, 1899.
W. SWINDELL.
METALLURGICAL FURNACE.
(Application filed Dec. 14, 1898.)
(No Model.) 4 Sheets—Sheet 3.
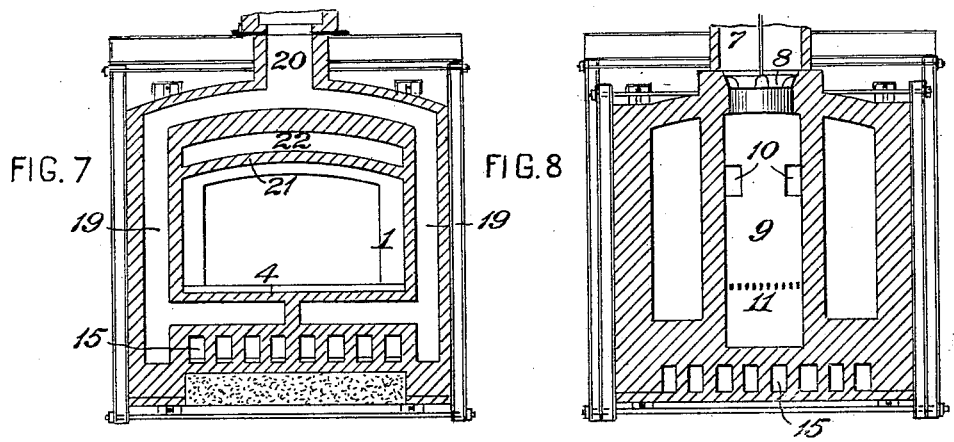
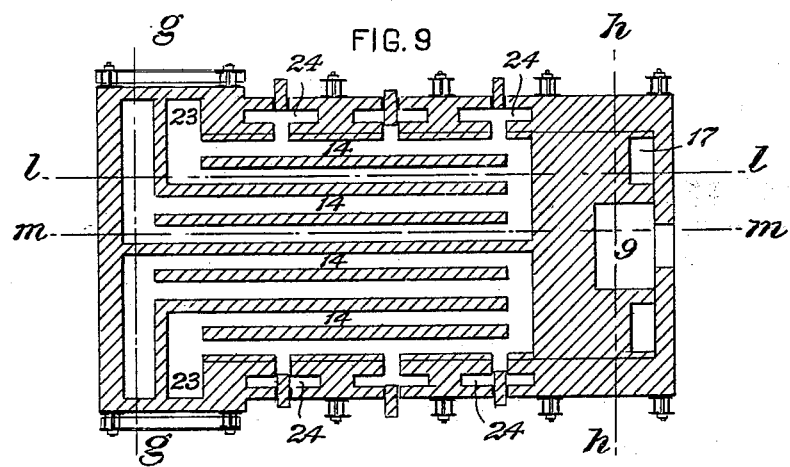
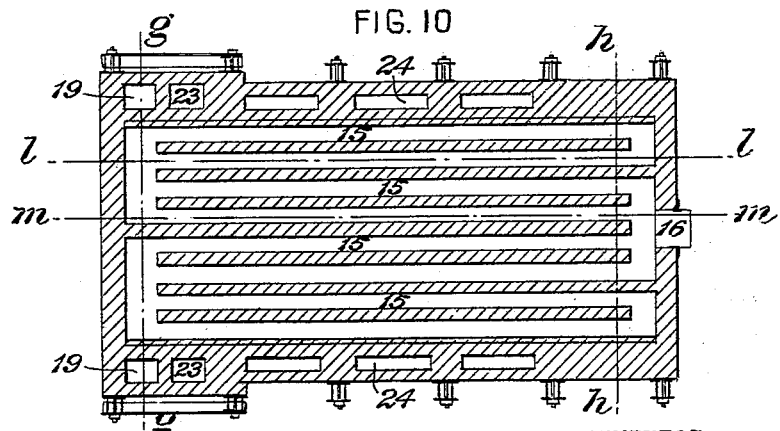
WITNESSES: James C. Herron, S. R. Bell.
INVENTOR, Wm. Swindell, by J. Snowden Bell, Att'y No. 625,367. Patented May 23, 1899.
W. SWINDELL.
METALLURGICAL FURNACE.
(Application filed Dec. 14, 1898.)
(No Model.) 4 Sheets—Sheet 3.
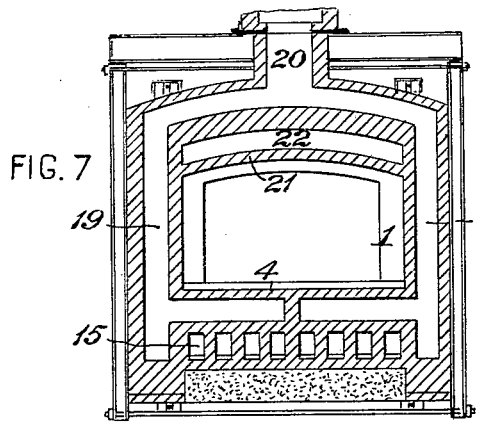
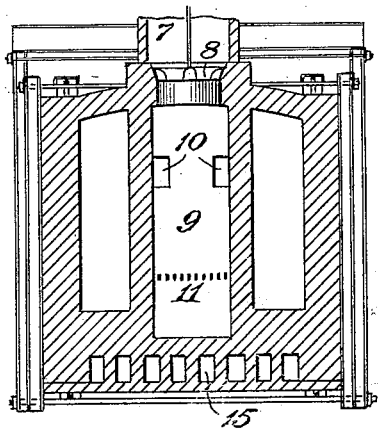
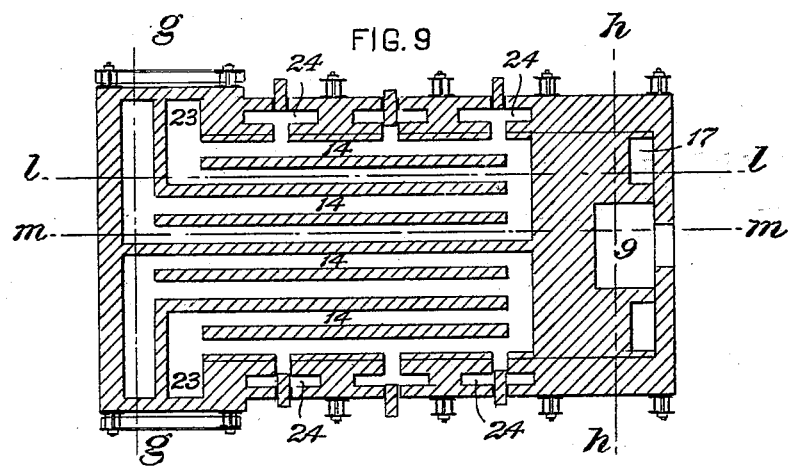
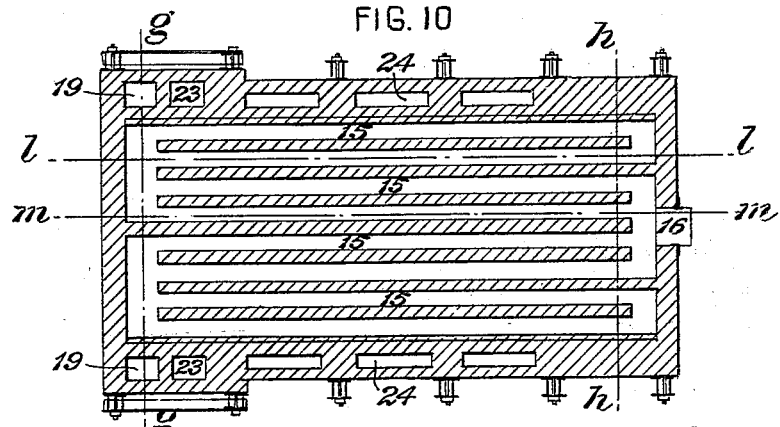
WITNESSES: INVENTOR, No. 625,367. Patented May 23, 1899.
W. SWINDELL.
METALLURGICAL FURNACE.
(Application filed Dec. 14, 1898.)

(No Model.) 4 Sheets—Sheet 4.

WITNESSES: INVENTOR,
James C. Herron. Wm Swindell,
P. R. Bell. by J. Howden Bell,
Att'y.

THE NORRIS PETERS CO., PHOTO-LITHO., WASHINGTON, D. C.

UNITED STATES PATENT OFFICE.

WILLIAM SWINDELL, OF PITTSBURG, PENNSYLVANIA.

METALLURGICAL FURNACE.

SPECIFICATION forming part of Letters Patent No. 625,367, dated May 23, 1899.

Application filed December 14, 1898. Serial No. 699,215. (No model.)

*To all whom it may concern:*

Be it known that I, WILLIAM SWINDELL, of Pittsburg, in the county of Allegheny and State of Pennsylvania, have invented a certain new and useful Improvement in Metallurgical Furnaces, of which improvement the following is a specification.

My invention relates to recuperative furnaces for heating metals by the combustion of gaseous fuel; and its object is to provide a furnace of such class which shall be of simple, compact, and inexpensive construction and in which the waste products of combustion may be thoroughly and effectively utilized in imparting heat to the heating-chamber of the furnace and to the supply of air required for admixture with the gas in their traverse from the combustion-chamber to the discharge flue or stack.

The improvement claimed is hereinafter fully set forth.

Figure 11:
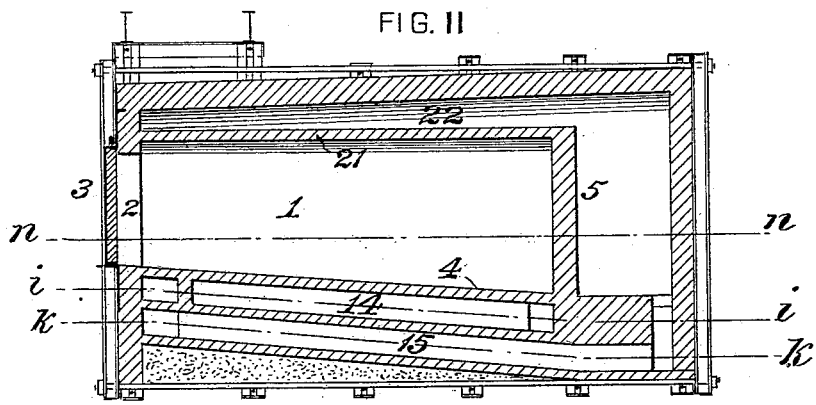
Figure 12:
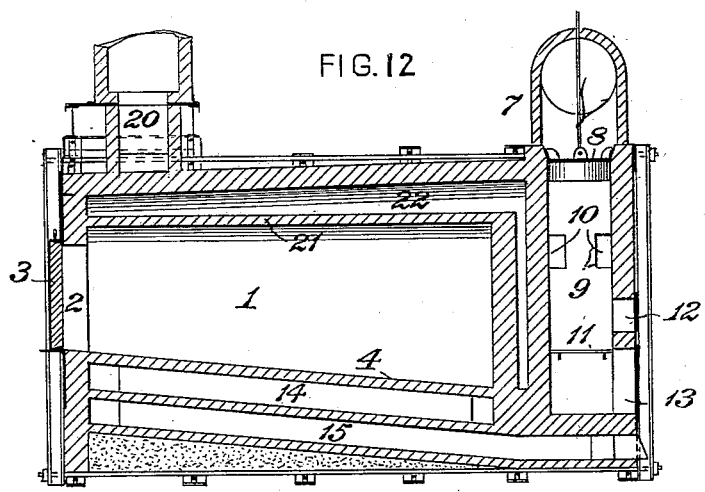
Figure 13:
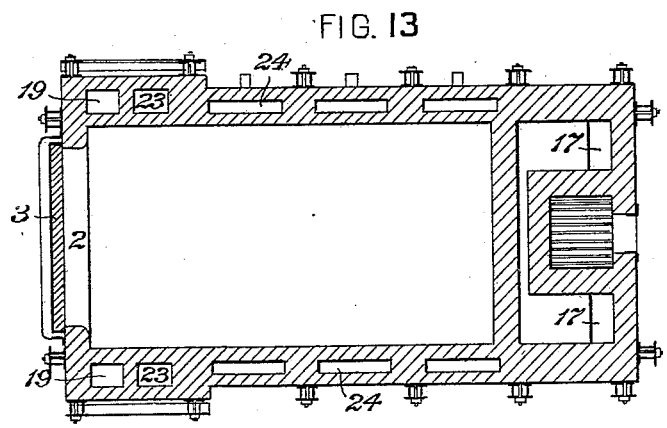

In the accompanying drawings, Figure 1 is a vertical transverse section through a metallurgical furnace, illustrating an embodiment of my invention at the line $a\,a$ of Figs. 2, 3, and 6; Fig. 2, a horizontal section at the line $b\,b$ of Fig. 4; Fig. 3, a similar section at the line $c\,c$ of Fig. 4; Fig. 4, a vertical longitudinal section at the line $d\,d$ of Figs. 2 and 3; Fig. 5, a similar section at the line $e\,e$ of Figs. 2 and 3; Fig. 6, a longitudinal section at the line $f\,f$ of Fig. 4; Fig. 7, a vertical transverse section at the line $g\,g$ of Figs. 9 and 10, showing the furnace as of the "muffle" type or having its heating-chamber closed to the products of combustion; Fig. 8, a similar section at the line $h\,h$ of Figs. 9 and 10; Fig. 9, a horizontal section at the line $i\,i$ of Fig. 11; Fig. 10, a similar section at the line $k\,k$ of Fig. 11; Fig. 11, a longitudinal section at the line $l\,l$ of Figs. 9 and 10; Fig. 12, a similar section at the line $m\,m$ of Figs. 9 and 10, and Fig. 13 a similar section at the line $n\,n$ of Fig. 11.

In the practice of my invention I construct a furnace having a heating or combustion chamber 1 for the reception of the articles to be heated, which chamber is preferably of substantially square or rectangular section, both longitudinally and transversely, and is provided at one of its ends with a charging-opening 2, closed by a door 3 and located on or near the level of the floor 4 of the heating-chamber. A bridge-wall 5 extends across the opposite end of the chamber from its floor to an upper opening or passage 6, through which the products of combustion of a mixture of gas and air pass into the heating-chamber.

Gaseous fuel is supplied to the furnace from a producer or other source of gas-supply through a gas-conduit 7, which is controlled by a gas-supply valve 8 and leads into a supply-chamber 9, located adjacent to the bridge-wall 5 and provided with gas-outlets 10, through which the supply of gas passes out to be mingled with air and burned as the mixture enters the heating-chamber through the passage 6 at the top of the bridge-wall. A grate 11 is located in the lower portion of the supply-chamber between a fuel-supply opening 12 and an ash-pit opening 13, each closed by a suitable door, and serves when desired to support solid fuel, by which the furnace may be kept at a proper temperature when the gas-supply is shut off or accumulation of soot may be burned away.

The volume of air required for admixture with the gas to effect the proper combustion thereof is led into the space around the supply-chamber and meets and mingles with the gas as it passes out of the gas-outlets 10. The flues or conduits through which air is supplied to the furnace and the waste products of combustion discharged therefrom extend longitudinally below the floor 4 of the heating-chamber and are so disposed and related as to provide as large area of surface as practicable for the heating of the incoming currents of air by the outgoing waste products of combustion in order that the heat of the latter may be fully utilized before their escape to and out of the stack.

A plurality of waste-flues 14, through which the waste products of combustion pass from the heating-chamber to the exit flue or stack, and which will presently be more fully described, is built longitudinally in the masonry of the furnace immediately below the floor 4 of the heating-chamber, and a plurality of longitudinal air-admission flues 15 is built below and immediately adjoining the waste-flues 14, each of which waste-flues is interposed between the floor of the heating-chamber and the upper wall of one of the air-admission flues. The air-admission flues 15 extend throughout the length of the furnace and are preferably, as shown, disposed in pairs communicating at opposite ends, so that the air-currents, which enter at an air-inlet 16 at the end of the furnace adjacent to the gas-supply chamber 9, traverse the length of the furnace in alternately opposite directions and are delivered from the flues 15 through ports 17 to the space surrounding the supply-chamber 9, within which space, at the gas-outlets 10, they mingle with the gas which is supplied to the chamber through the conduit 7.

The waste products of combustion pass out of the heating-chamber 1 through vertical waste-flues 18, leading out of opposite sides of said chamber at the end thereof farthest from the gas-outlet ports 10, and pass from the vertical flues 18 into the system of horizontal waste-flues 14, which flues are, as before stated, interposed between the floor of the heating-chamber and the air-admission flues. The waste-flues 14 are, similarly to the air-admission flues, preferably disposed in pairs communicating at opposite ends, which pairs lead from the vertical flues 18 to or near the bridge-wall 5 and thence in the opposite direction to vertical flues 19, located adjacent to the flues 18 and leading in this instance upwardly to a connection with a common exit flue or stack 20, through which they are discharged. It will be obvious that, if preferred, the waste-flues and air-admission flues may in each case be disposed so that the alternate traverse in opposite directions of products of combustion and of air may be in single flues instead of pairs of flues.

Under the above construction it will be seen that the exit traverse of the waste products of combustion is materially extended and that a portion of their heat is imparted to the floor of the heating-chamber 1 in their traverse in opposite directions thereunder. A portion of their heat is also imparted to the incoming air, which passes in opposite directions through the system of air-admission flues immediately below the waste-flues, the inlet traverse of the air being correspondingly extended. The waste heat is thus effectively utilized, and this advantageous result is attained without a substantial increase in the compass of the furnace and without involving complicated or tortuous passageways.

Figs. 7 to 13, inclusive, illustrate my invention as applied in a muffle-furnace designed and adapted for use in enameling or subjecting to heat for other purposes articles which require to be protected from exposure to direct contact with the products of combustion during the operation. In order to afford such protection, the heating-chamber 1 is closed at top by an arched roof 21, Figs. 7, 11, and 12, which extends from the bridge-wall to the opposite or front end wall of the furnace, a passage 22, in which the heat of the products of combustion is exerted upon the roof of the heating-chamber and which extends entirely across the furnace, being interposed between the roof of the heating-chamber and the roof of the furnace.

The hot products of combustion of the mixture of gas and air, which is ignited at the gas-outlet ports 10 of the supply-chamber 9, as in the instance first described, pass through the passage 22, in which their heat is imparted to the heating-chamber, and thence pass downwardly through vertical waste-flues 23 on opposite sides of the heating-chamber near the front end thereof and vertical waste-flues 24, formed in the side walls of the heating-chamber into a system of horizontal waste-flues 14, substantially similar to that first described, in which they traverse in alternately opposite directions immediately beneath the floor of the heating-chamber and from which they pass into vertical flues 19, located at the front end of the furnace and leading into a common exit flue or stack, with which they may be connected either above or below the furnace. The vertical flues 24 enable the heat of the waste products to be imparted to the sides of the heating-chamber. The system of air-admission flues 15 is, as in the instance first described, located immediately below the waste-flues 14 and is in all substantial particulars similar to the air-admission-flue system first described, and the incoming air is similarly heated therein by the waste products of combustion.

I claim as my invention and desire to secure by Letters Patent—

1. In a metallurgical furnace, the combination of a heating-chamber, means for applying heat from gaseous fuel thereto, a system of tortuous waste-flues extending alternately forwardly and rearwardly in a substantially horizontal plane beneath the floor of the heating-chamber, and communicating at opposite ends so as to admit of the traverse in opposite directions of outgoing waste products of combustion beneath the floor of the heating-chamber, and a corresponding system of substantially horizontal air-admission flues underlying the waste-flues, and communicating at opposite ends so as to admit of the traverse, in opposite directions, of incoming air beneath the walls of the waste-flues.

2. In a metallurgical furnace, the combination of a heating-chamber, a gas-supply chamber located adjacent to one end thereof and provided with gas-outlet ports, a system of tortuous waste-flues extending alternately forwardly and rearwardly in a substantially horizontal plane beneath the floor of the heating-chamber and substantially parallel therewith and having receiving ends at or near the end of the furnace farthest from the gas-supply chamber, said waste-flues communicating at opposite ends for the traverse of waste products therethrough in opposite directions, an air-inlet, and a system of substantially horizontal air-admission flues corresponding to and underlying the waste-flues, and leading from the air-inlet to the outlet-ports of the gas-supply chamber.

3. In a metallurgical furnace, the combination of a heating-chamber having a charging opening or door at one end and a bridge-wall at the opposite end, a gas-supply chamber provided with gas-outlet ports adjacent to said bridge-wall, tortuous waste-flues communicating with the heating-chamber at its front end and extending alternately forwardly and rearwardly in a substantially horizontal plane beneath the floor of the heating-chamber and communicating with an exit-stack at the front end thereof, and a corresponding system of substantially horizontal air-flues underlying said waste-flues and leading from an air-inlet to the space around the gas-outlet ports.

4. In a metallurgical furnace, the combination of a heating-chamber having a charging opening and door at one of its ends, a bridge-wall at the opposite end of said chamber, an air-inlet, a gas-supply chamber provided with outlet-ports adjacent to the bridge-wall, a valve-controlled gas-conduit leading into said chamber, a grate in the lower portion of the gas-supply chamber, a fuel opening and door, and an ash-pit opening and door, in the wall of the gas-supply chamber above and below said grate respectively, vertical flues for the reception of waste products of combustion at the end of the furnace adjacent to the charging opening and door, a system of horizontal waste-flues communicating with the vertical waste-flues and underlying the heating-chamber, and a system of air-admission flues underlying the horizontal waste-flues and leading from the air-inlet to the space around the gas-outlet ports.

5. In a metallurgical furnace, the combination of a heating-chamber, a roof closing the top of said chamber and separated from the roof of the furnace by a longitudinal combustion-passage, a bridge-wall closing the inner end of the heating-chamber, a gas-supply chamber provided with gas-outlet ports adjacent to the bridge-wall, vertical flues leading from the combustion-passage at the end thereof farthest from the bridge-wall, a system of horizontal waste-flues communicating with said vertical flues and extending alternately forwardly and rearwardly in a plane beneath and adjacent to the floor of the heating-chamber, an air-inlet and a corresponding system of air-admission flues underlying the horizontal waste-flues and leading from the air-inlet to the space around the gas-outlet ports.

6. In a metallurgical furnace, the combination of a heating-chamber, a roof closing the top of said chamber and separated from the roof of the furnace by a longitudinal combustion-passage, a bridge-wall closing the inner end of the heating-chamber, a gas-supply chamber provided with gas-outlet ports adjacent to the bridge-wall, vertical waste-flues in the sides of the heating-chamber, leading downwardly from the combustion-passage, a system of horizontal waste-flues communicating with said vertical flues and extending in a tortuous course underneath, adjacent to and substantially parallel with the floor of the heating-chamber, an air-inlet, and a system of air-admission flues, corresponding to, underlying and adjacent to the waste-flues and leading from the air-inlet to the space around the gas-outlet ports.

WILLIAM SWINDELL.

Witnesses:
J. SNOWDEN BELL,
JAMES C. HERRON.